(No Model.) 3 Sheets—Sheet 1.

J. W. & Z. W. OGLESBY.
SELF FEEDING COTTON CLEANER AND GIN FEEDER.

No. 293,771. Patented Feb. 19, 1884.

Witnesses:
Phil C. Dieterich.
W R Keyworth.

Inventors:
James W. Oglesby
Zenos W. Oglesby
by Smith & Myers
Atty.

(No Model.) 3 Sheets—Sheet 2.
J. W. & Z. W. OGLESBY.
SELF FEEDING COTTON CLEANER AND GIN FEEDER.
No. 293,771. Patented Feb. 19, 1884.

Witnesses:
Phil C. Dirterich.
W. R. Keyworth.

Inventors:
James W. Oglesby
Zenas W. Oglesby
By Smith & Myers
Atty.

(No Model.)  3 Sheets—Sheet 3.

J. W. & Z. W. OGLESBY.
SELF FEEDING COTTON CLEANER AND GIN FEEDER.

No. 293,771. Patented Feb. 19, 1884.

UNITED STATES PATENT OFFICE.

JAMES WOOD OGLESBY AND ZENOS WISE OGLESBY, OF KINGSTON, GEORGIA.

SELF-FEEDING COTTON-CLEANER AND GIN-FEEDER.

SPECIFICATION forming part of Letters Patent No. 293,771, dated February 19, 1884.

Application filed May 25, 1883. (No model.)

*To all whom it may concern:*

Be it known that we, JAMES WOOD OGLESBY and ZENOS WISE OGLESBY, citizens of the United States, residing at Kingston, in the county of Bartow and State of Georgia, have invented certain new and useful Improvements in Self-Feeding Cotton-Cleaners and Gin-Feeders; and we do hereby declare the following to be a full, clear, and exact description of the invention, such as will enable others skilled in the art to which it appertains to make and use the same.

Our invention relates to self-feeding cotton-cleaners and gin-feeders.

The object of our invention is to take the cotton as it is brought from the field to the gin-house, thoroughly disintegrate and separate the same, remove all particles of dust and trash from the cotton, and deliver the same to the gin without extra handling or extra work, thereby saving a great amount of labor and expense, and at the same time delivering the cotton to the mouth of the gin in the best possible condition. Heretofore to accomplish this result in part necessitated the use of two or three extra hands to tend the machine, and the cotton fiber, when delivered to the gin, was mixed with more or less dirt and trash that was injurious to the machine and dulled the saws, necessitating the stopping of the same to repair and readjust. Our improvement separates the dust and light trash from the cotton, and delivers the cotton in light flaky form into the mouth of the gin, making the staple in better condition for market.

The peculiar construction and arrangement of the various parts of our invention will be more fully pointed out and described in the specification and claims.

Figure 1:
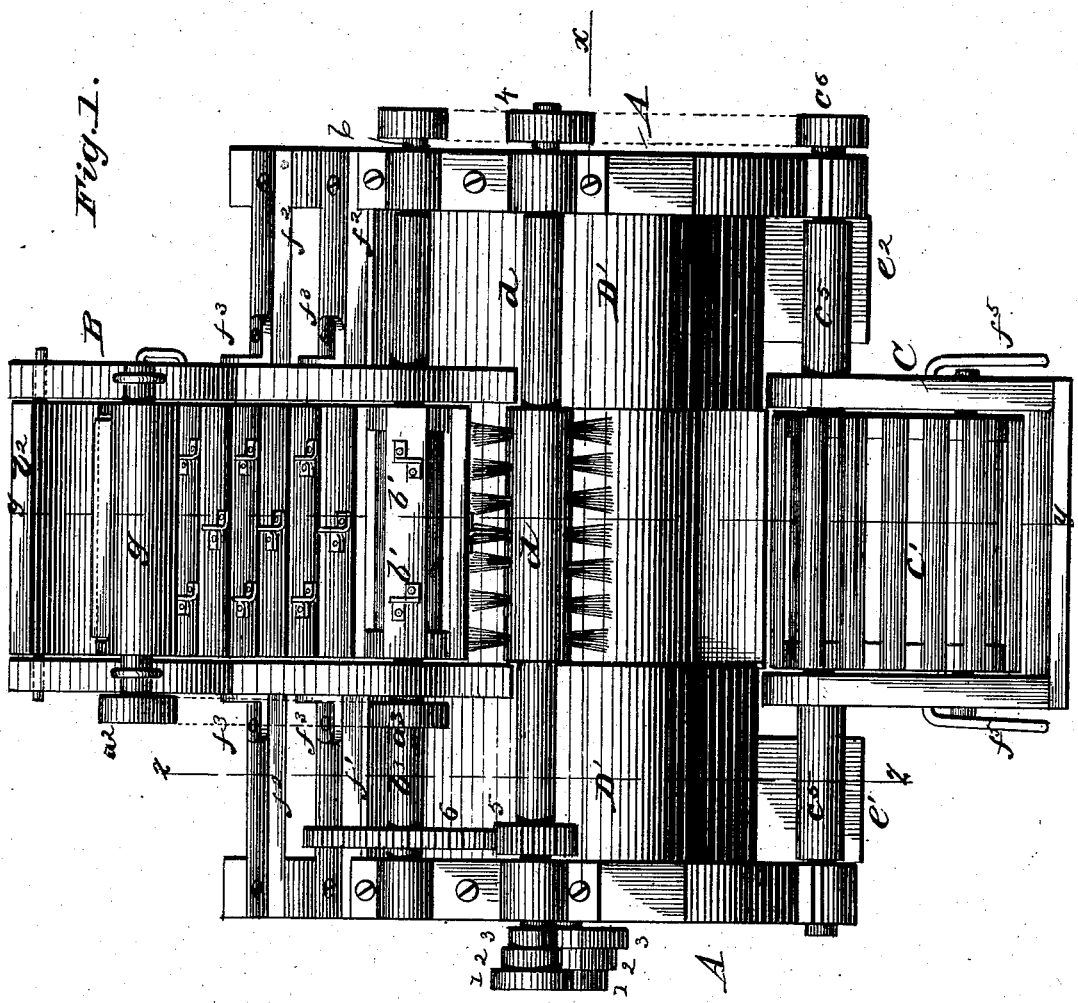
Figure 2:
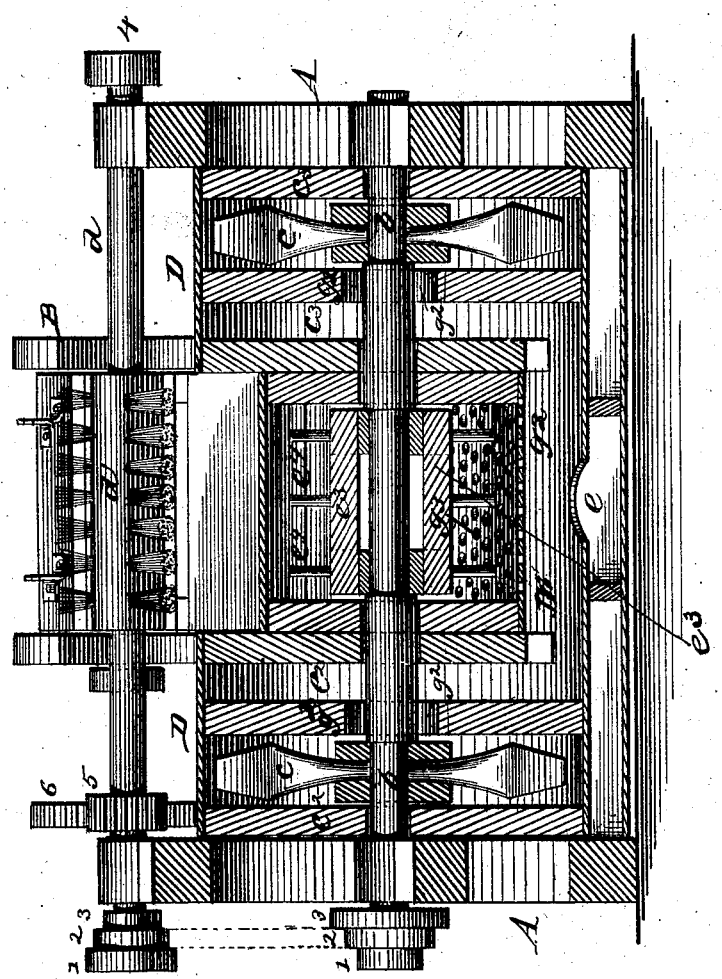
Figure 3:
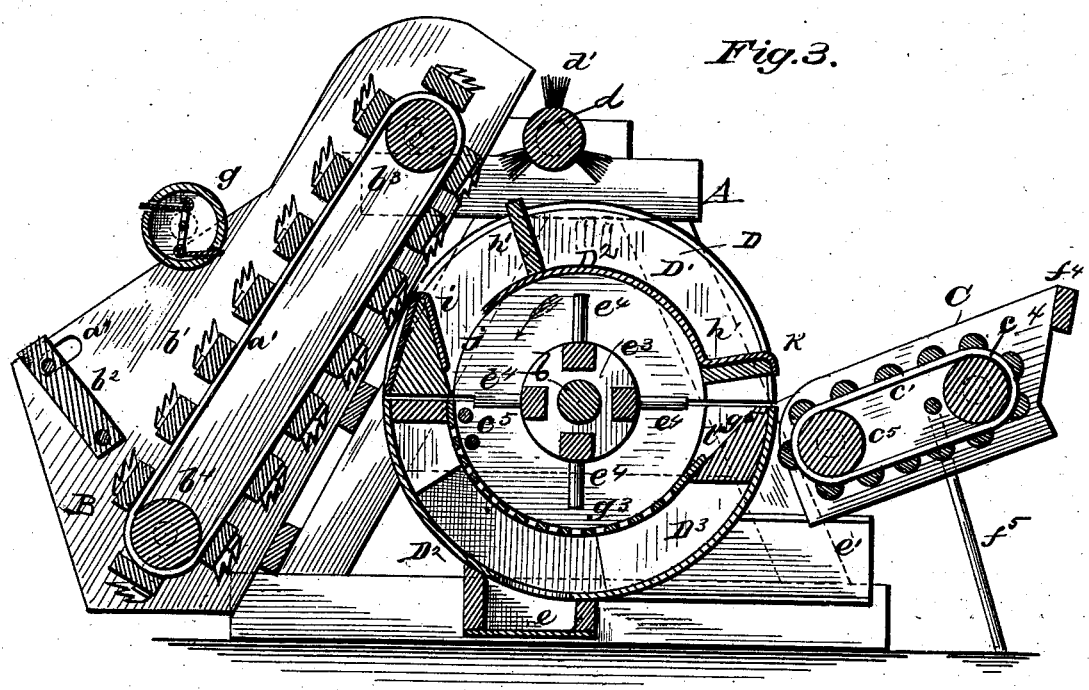
Figure 4:
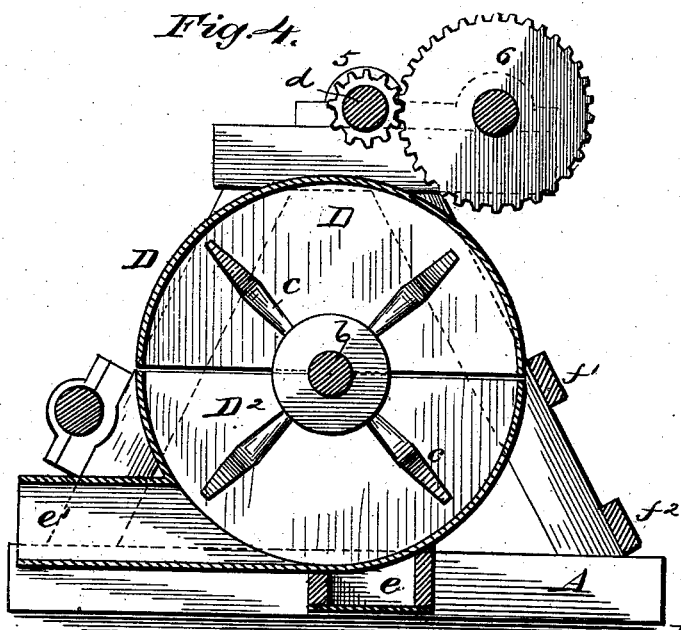

Referring to the drawings accompanying this application and forming part of the same, Figure 1 is a top view of our invention, showing the conveyer, brush, and delivery-feed. Fig. 2 is a vertical sectional view of the same, taken on the line $x$ $x$, showing the brush, screen, beaters, and exhaust-fans. Fig. 3 is a longitudinal sectional view taken on the line $y$ $y$, showing the endless apron-conveyer, the cylinder inclosing the fans and beaters, and the endless delivery-apron. Fig. 4 is a vertical cross-section, showing the gear-wheels, fans, and induction and eduction flues.

Similar letters refer to similar parts throughout the drawings.

Reference being had to the drawings, the letter A represents a frame, on one side of which is mounted, in an inclined position, a box, B, with its sides, at their lower ends, enlarged in width, to accommodate and retain the cotton as it is placed therein from baskets or other receptacles from the field or gin-house. Extending between the sides of said box, and near the lower end of the same, is an endgate or stop-board, $b^2$, said board being pivoted at its lower edge by pivot-pins through its ends to the sides of the box B, and provided with projecting pins on its outer ends, that pierce elongated slots $a^4$, formed in the sideboards for their reception, the purpose of which is to permit of the adjustment of said board to different inclines, as desired, in feeding in the cotton. An endless belt, $a'$, mounted on rollers or shafts $b^3$ and $b^4$, by which it is moved, and provided with cross-slots carrying saw-teeth $b'$, projecting upward, moves within said box, and carries the cotton forward as it is delivered on the same in front of board $b^2$. About midway of the length of said box, and on its outer edges, is journaled a crossroller, $g$, having radiating wings, and its use is to keep all lumps of cotton back, permitting only that which is firmly held by saws to pass over. This roller is not herein claimed, but it is described, shown, and claimed by us in an application for Letters Patent filed June 2, 1883, Serial No. 96,880.

Near the upper or inner end of box B are mounted on a shaft, $d$, a series of brushes, $d'$, adapted to deflect the cotton downward as it is delivered against said brushes by the endless belt $a'$. Said shaft $d$ is mounted in suitable bearings on the top of frame A, and has on one end a tight pulley, 4, by which motion is communicated to the machine by belt, (not shown,) and on its opposite end a series of pulleys of different diameters, 1 2 3, the purpose of which is to regulate the speed of other parts of the machine. A short distance inward from said pulleys is secured on shaft $d$ a gear-wheel, 5, that is adapted to gear into or with gear-wheel 6, secured on shaft $b^3$, around which passes the belt $a'$, and by which said belt receives motion or is carried.

Directly under shaft $d$, and between the inclined uprights of frame A, is secured a cylinder, D, formed in two longitudinal half-sections, D' D², and centrally through the same is journaled, on cross-bars between the inclined uprights of frame A, a shaft, $b$. The outer end of shaft $b$ is provided with a series of pulleys of different diameters, 1 2 3, and arranged in opposite form to pulleys on shaft $d$, to which they are connected by a belt, (not shown) and by means of which motion is communicated to said shaft from shaft $d$. A short distance inward from the ends of shaft $b$, and rigidly secured on the same, are projecting fan-blades $c$, adapted to revolve between partitions $c^2 c^2$ and $c^3 c^3$, each inner partition being recessed around shaft $b$, to permit the exhaust-air containing dust and light trash to pass out. A short distance inward from said inner partitions is formed a concave box having a perforated bottom, the upper edges of said box being formed to receive a portion of shaft $b$. The inlet-opening of said box has a perforated beater board or bars, $c^5$, and the outlet-opening of said box is formed tapering, as at $g^5$, to permit of the smooth and easy delivery of the cotton onto the adjoining endless belt $c'$. The center of shaft $b$ is provided with a drum, $e^3$, having metal projecting arms or beaters $e^4$, adapted to beat and whip out all particles of dust and light trash from the cotton staple as shaft $b$ revolves. The drum $e^3$ is fixed to the shaft $b$. Its object is to receive and secure the inner ends of the arms $e^4$.

Below the concave perforated bottom $g^3$, and between the same and the outer casing, D², is formed an air-space, D³, into which the dust and fine particles of trash are drawn by the exhaust-fans $c$. Said air-space connects with the discharge-flues $e' e^2$ through the recesses in the partitions around the shaft $b$. The air, being exhausted from under the perforated box or bottom $g^3$ by the revolutions of the fans $c$, is drawn through the spaces or into the fan-chambers, and discharged through the flues $e' e^2$ beneath the floor of the building or outside of the same.

Loosely secured on shaft C⁵ is a box or frame, C, having a shaft, $c^4$, journaled in and near the outer ends of the sides of said frame, around which passes an endless belt or belts, across which slats or cross-pieces are secured. Said belt or belts are continued around the shaft C⁵, and through which said belt receives motion. Shaft C⁵ is provided on its outer end with a fast pulley, $c^6$, that is connected with a pulley, 4, on the end of shaft $d$. An end-board or inclined stop-board, $f^4$, is secured to the outer ends of the frame C, against which the cleaned cotton staple strikes, as it is carried forward by the endless belt $c'$, said cotton being carried down between the endless apron $c'$ and the end-board $f^4$ into the gin, by which the cotton-seed is removed. The position of the discharge-opening is regulated by the standards $f^5$, that are loosely secured by their upper ends to the outer sides of the frame or box C.

The upper half of cylinder D is constructed similar on its inner surface to the lower half, being provided with partitions and spaces corresponding and matching when brought together, except that the central concave space is covered with a solid-metal convex strip, D², adapted to inclose the cotton staple while the revolving arms $e^4$ are disintegrating and beating the same.

To the upper section, D', of cylinder D is secured the stop-board $h'$, that is inserted in recesses in the ends of said upper section, and at a point about its center, the purpose of said board being to prevent the cotton staple from being carried over the cylinder, and to guide or deflect the same downward. An inclined projection, $i$, extends upward on the inner face of section D', and between said inclined projection $i$ and the board $h'$ is formed an opening, $j$, of sufficient width and length to permit the cotton to pass readily into the cylinder D. A discharge-opening, $l'$, is formed on the opposite edge of section D'. By means of a projection, K, extending inward to the metal casing covering the arms $e^4$, the revolution of said arms forces the cotton staple outward against the incline $g^5$, through the space, and out onto the endless apron $c'$, by which it is carried into the gin. Cross-bars $f'$ and $f^2$ are secured to the front of frame A, to which, by metal brackets $f^3$, the box B is rigidly secured. A belt (not shown) connects pulley $a^2$ on roller $g$ with pulley $a^3$ on shaft $b^3$, by which motion is imparted to said roller $g$.

The operation is as follows: Cotton is placed on the endless saw-tooth belt $a'$ in the box B. Motion is given to the machine by belt on pulley 4. The cotton is carried by apron $a'$ against the brush $d'$, which deflects it into the cylinder D, where it is subjected to beating by revolving arms $e^4$, the fine dust and trash being exhausted by the fans $c$ and blown out through the discharge-flues $e' e^2$, and the cotton thrown out onto the apron $c'$, by which it is carried into the gin.

Having thus described our invention, what we desire to secure by Letters Patent is—

1. A self-feeding cotton-cleaner and gin-feeder consisting of a frame, an endless receiving-belt provided with projecting saw-teeth, a revolving brush, a perforated cylinder having feed and discharge openings, a cylinder provided with arms working within said perforated cylinder, revolving exhaust-fans at the ends of said perforated cylinders, suitable exhaust and discharge flues, an endless apron, and suitable operating mechanism, substantially as and for the purpose set forth.

2. In a cotton-cleaner, the combination of a frame, a perforated cylinder provided with openings for the reception and discharge of the cotton, a series of projecting arms mounted on a revolving shaft working within said cylinder, a pair of exhaust-fans, exhaust and discharge flues, means for feeding to and carrying away the cotton from said cylinder, and suitable operating mechanism, substantially as and for the purpose set forth.

3. A cotton-cleaner comprising a frame, a cleaning-cylinder the lower half of which is perforated, a revolving shaft working centrally through said cylinder, said shaft having projecting arms and fan-blades mounted thereon, suitable fan-casings, exhaust and discharge flues, a revolving brush journaled above said cylinder, an endless apron, said apron being adapted to deliver the cotton against said brush and into said cylinder, and suitable operating mechanism, substantially as and for the purpose set forth.

4. In a cotton-cleaner, the cylinder D, having an inlet-opening, $j$, inclined metal projection $i$, stop-board projection $h'$, discharge-opening $l'$, incline $g^5$, perforated bottom $g^3$, and projection K, in combination with the shaft $b$, fan-blades $c$, drum $e^3$, arms $e^4$, fan-casings, and discharge-flues $e'$ $e^2$, substantially as and for the purpose set forth.

In testimony whereof we affix our signatures in presence of two witnesses.

JAMES WOOD OGLESBY.
ZENOS WISE OGLESBY.

Witnesses:
J. M. DAVIDSON,
R. S. POPE.